US012130650B2

(12) United States Patent
Chen

(10) Patent No.: US 12,130,650 B2
(45) Date of Patent: Oct. 29, 2024

(54) REFERENCE VOLTAGE GENERATING SYSTEM AND START-UP CIRCUIT THEREOF

(71) Applicant: Himax Technologies Limited, Tainan (TW)

(72) Inventor: Kuan-Hung Chen, Tainan (TW)

(73) Assignee: Himax Technologies Limited, Tainan (TW)

( * ) Notice: Subject to any disclaimer, the term of this patent is extended or adjusted under 35 U.S.C. 154(b) by 227 days.

(21) Appl. No.: 17/882,896

(22) Filed: Aug. 8, 2022

(65) Prior Publication Data

US 2023/0142312 A1 May 11, 2023

(30) Foreign Application Priority Data

Nov. 8, 2021 (TW) ................................ 110141454

(51) Int. Cl.
*G05F 3/24* (2006.01)
*G05F 1/46* (2006.01)
*G05F 3/16* (2006.01)

(52) U.S. Cl.
CPC .................................... *G05F 3/24* (2013.01)

(58) Field of Classification Search
CPC .................................. G05F 1/468; G05F 3/24
See application file for complete search history.

(56) References Cited

U.S. PATENT DOCUMENTS 5,949,227 A * 9/1999 Bujanos .................. G05F 3/242 323/901
6,392,470 B1 * 5/2002 Burstein .................. G05F 3/30 327/539
7,208,929 B1 * 4/2007 Rabeyrin .................. G05F 3/30 323/901
7,286,002 B1 * 10/2007 Jackson .................. G05F 3/30 327/539
7,728,574 B2 * 6/2010 Kalyanaraman .......... G05F 3/30 323/901
9,035,641 B1 * 5/2015 Le .......................... G05F 1/468 323/313
10,061,340 B1 * 8/2018 Rao ........................ G05F 3/267
2007/0139029 A1 * 6/2007 Krishna .................. G05F 1/468 323/313

(Continued)

FOREIGN PATENT DOCUMENTS

CN 114326906 A * 4/2022
CN 117724567 A * 3/2024

(Continued)

OTHER PUBLICATIONS

Office Action Dated Aug. 15, 2022 in corresponding Taiwan Patent Application No. 110141454.

*Primary Examiner* — Sisay G Tiku
(74) *Attorney, Agent, or Firm* — Donald E. Stout; Stout, Uxa & Buyan, LLP

(57) ABSTRACT

A start-up circuit includes series-connected first-type first transistors through which a start-up current flows in a start-up period, being connected between a positive power voltage and an inner node; and a first-type second transistor through which a boost current flows in the start-up period, being connected between the positive power voltage and the inner node, and with a gate connected to an output node that provides a bias voltage.

15 Claims, 2 Drawing Sheets

(56) References Cited

U.S. PATENT DOCUMENTS

| | | | | |
|---|---|---|---|---|
| 2009/0115775 | A1* | 5/2009 | Chuang | G05F 3/30<br>345/215 |
| 2011/0006749 | A1* | 1/2011 | Stellberger | G05F 3/30<br>323/313 |
| 2017/0277210 | A1* | 9/2017 | Nilson | G05F 1/468 |
| 2018/0232000 | A1* | 8/2018 | Nilson | G05F 3/16 |
| 2020/0401167 | A1* | 12/2020 | Helmy Zaky | G05F 3/16 |
| 2023/0034057 | A1* | 2/2023 | Chattu | G11C 11/4074 |
| 2023/0046259 | A1* | 2/2023 | Iqbal | G11C 5/148 |

FOREIGN PATENT DOCUMENTS

| | | | | |
|---|---|---|---|---|
| EP | 2273339 | A1 * | 1/2011 | G05F 3/30 |
| EP | 3318950 | A1 * | 5/2018 | G05F 1/468 |
| JP | 2006067416 | A * | 3/2006 | |
| JP | 2012034101 | A * | 2/2012 | |
| TW | 202401200 | A * | 1/2024 | G05F 1/461 |
| WO | WO-2023233565 | A1 * | 12/2023 | |

* cited by examiner

REFERENCE VOLTAGE GENERATING SYSTEM AND START-UP CIRCUIT THEREOF

CROSS-REFERENCE TO RELATED APPLICATIONS

This application claims the benefit of Taiwan Patent Application No. 110141454, filed on Nov. 8, 2021, the entire content of which are herein expressly incorporated by reference.

BACKGROUND OF THE INVENTION

1. Field of the Invention

The present invention generally relates to a start-up circuit, and more particularly to a start-up circuit adaptable to a bandgap voltage reference circuit.

2. Description of Related Art

A bandgap voltage reference circuit is a temperature independent voltage reference circuit widely used in integrated circuits. The bandgap voltage reference circuit can produce a fixed constant voltage regardless of power supply variations, temperature changes or circuit loading.

A voltage reference circuit (e.g., bandgap voltage reference circuit) commonly operates in coordination with a start-up circuit, which starts a corresponding voltage reference circuit in a start-up period. Conventional start-up circuits may be affected by process, voltage and temperature (PVT) variations. For example, a bandgap voltage of the bandgap voltage reference circuit may be kept in an erroneous state in a low-temperature low-voltage condition. In another example, the start-up circuit cannot properly shut down after the start-up in a high-voltage condition, and may thus affect the bandgap voltage output of the bandgap voltage reference circuit.

A need has thus arisen to propose a novel scheme to overcome the drawbacks of the conventional start-up circuits.

SUMMARY OF THE INVENTION

In view of the foregoing, it is an object of the embodiment of the present invention to provide a start-up circuit capable of starting a bandgap voltage reference circuit successfully regardless of process, voltage and temperature (PVT) variations.

According to one embodiment, a reference voltage generating system includes a bandgap voltage reference circuit and a start-up circuit. The bandgap voltage reference circuit generates a bandgap voltage, and the start-up circuit starts the bandgap voltage reference circuit. The start-up circuit provides a bias voltage at an output node to the bandgap voltage reference circuit, and the bandgap voltage is fed to an input node of the start-up circuit. The start-up circuit includes series-connected first-type first transistors and a first-type second transistor. In a start-up period, a start-up current flows through the series-connected first-type first transistors, connected between a positive power voltage and an inner node. In the start-up period, a boost current flows through the first-type second transistor, connected between the positive power voltage and the inner node, and with a gate connected to the output node.

DETAILED DESCRIPTION OF THE INVENTION

Figure 1:
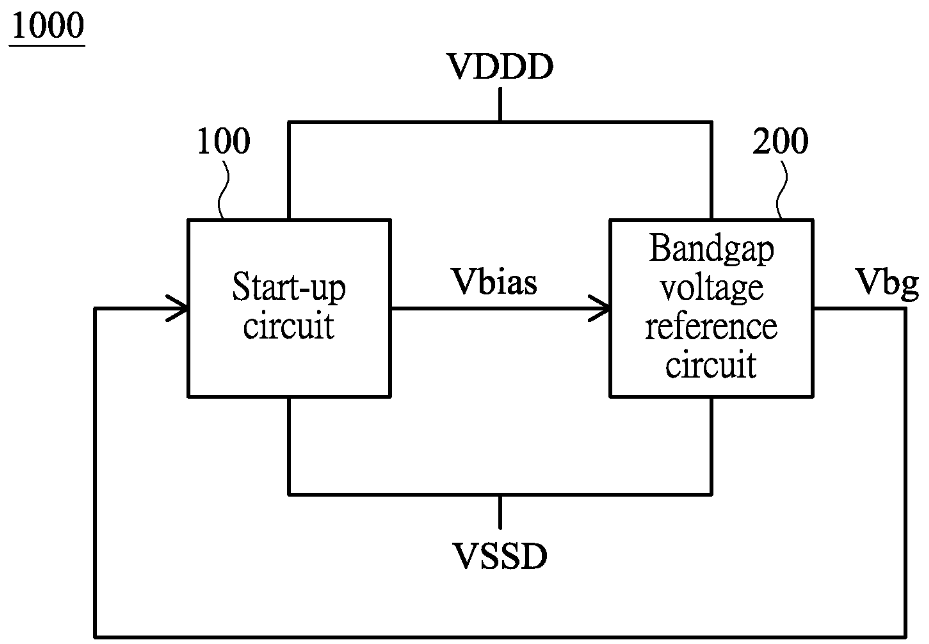
FIG. 1 shows a block diagram illustrating a reference voltage generating system.

FIG. 1 shows a block diagram illustrating a reference voltage generating system 1000 for generating a reference voltage. The reference voltage generating system 1000 of the embodiment may include a start-up circuit 100 and a bandgap voltage reference circuit 200 which is started by the start-up circuit 100.

In the embodiment, the start-up circuit 100 and the bandgap voltage reference circuit 200 are connected between a positive power voltage VDDD and a negative power voltage VSSD. The start-up circuit 100 provides a bias voltage Vbias at an output node to the bandgap voltage reference circuit 200, and a bandgap voltage Vbg (of about 1.2 volts) generated by the bandgap voltage reference circuit 200 is fed back to an input node of the start-up circuit 100.

Figure 2:
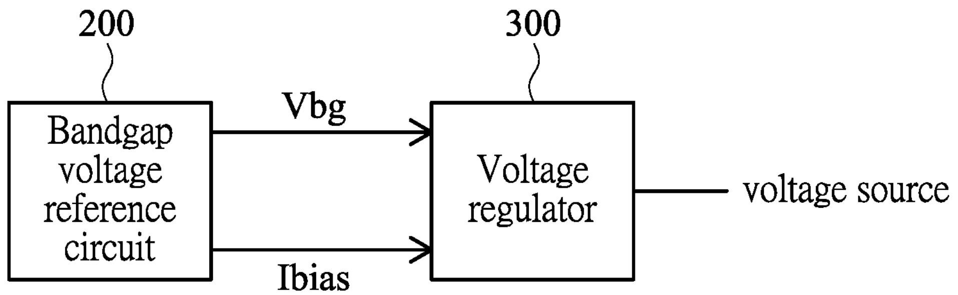
FIG. 2 shows a block diagram exemplifying application of the bandgap voltage reference circuit.

FIG. 2 shows a block diagram exemplifying application of the bandgap voltage reference circuit 200. Specifically, the bandgap voltage reference circuit 200 provides the bandgap voltage Vbg (i.e., reference voltage) to a voltage regulator 300, such as low-dropout (LDO) regulator, to generate a required constant voltage source. A bias current Ibias may be further provided to the voltage regulator 300 from the output node (i.e., Vbias) of the start-up circuit 100.

Figure 3:
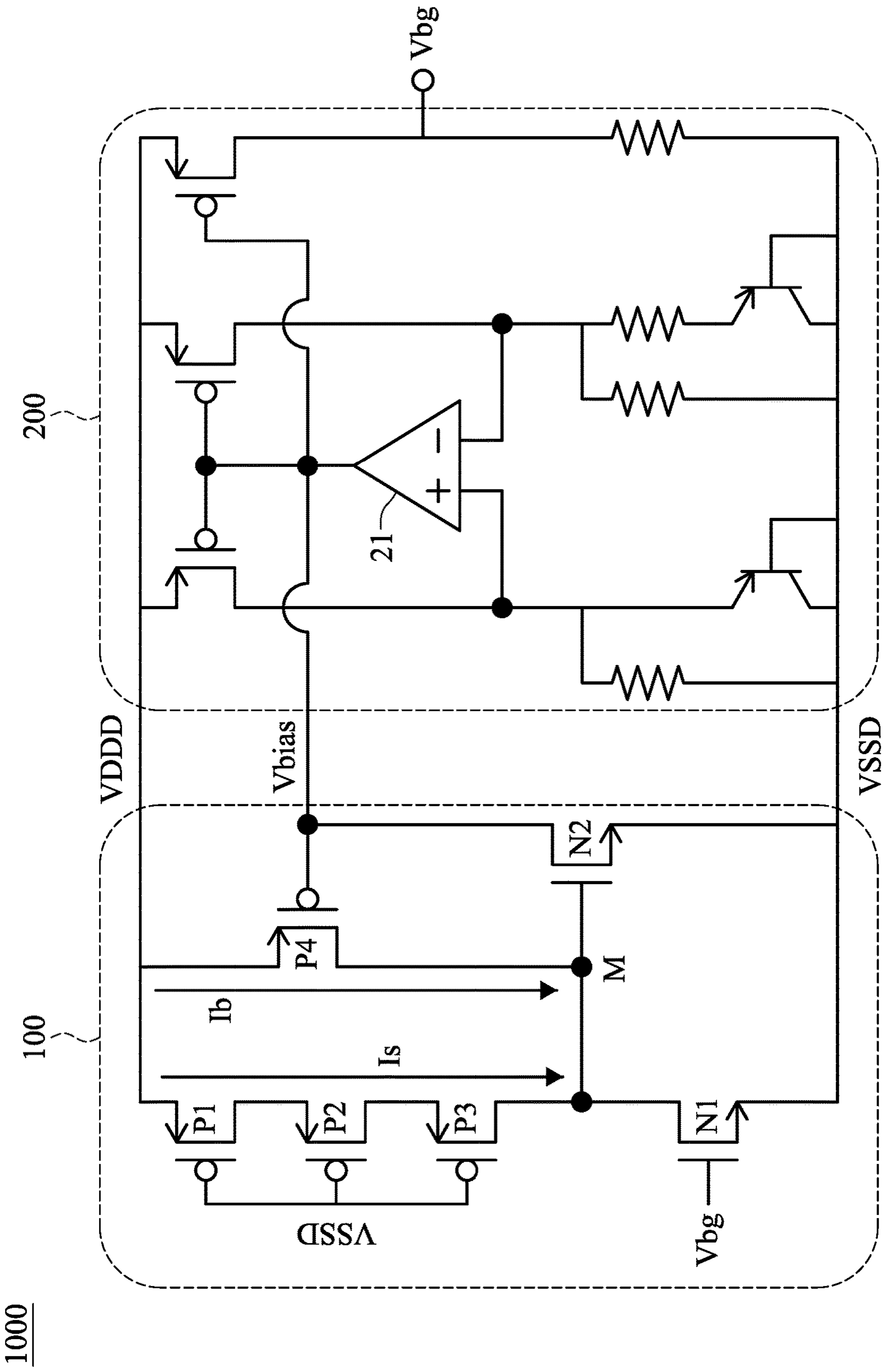
FIG. 3 shows a circuit diagram illustrating the reference voltage generating system according to one embodiment of the present invention.

FIG. 3 shows a circuit diagram illustrating the reference voltage generating system 1000 according to one embodiment of the present invention. It is noted that the start-up circuit 100 of the embodiment may be adapted to a circuit other than the bandgap voltage reference circuit 200 as exemplified in FIG. 3. In the embodiment, the start-up circuit 100 may include a plurality of (e.g., three) series-connected first-type (e.g., P-type) first transistors P1-P3, connected between the positive power voltage VDDD and an inner node M, and with gates connected to the negative power voltage VSSD. Specifically, a (first) first-type first transistor P1 has a source connected to the positive power voltage VDDD, and a drain connected to a source of a succeeding (second) first-type first transistor P2; a drain of the first-type first transistor P2 is connected to a source of a succeeding (third) first-type first transistor P3; and a drain of the first-type first transistor P3 is connected to the inner node M. The first-type first transistors P1-P3 and the following transistors may be metal-oxide-semiconductor (MOS) transistors.

According to one aspect of the embodiment, the start-up circuit 100 may include a first-type (e.g., P-type) second transistor P4 connected between the positive power voltage VDDD and the inner node M, and with a gate connected to an output node (i.e., bias voltage Vbias). Specifically, the first-type second transistor P4 has a source connected to the positive power voltage VDDD, and a drain connected to the inner node M.

The start-up circuit 100 of the embodiment may include a second-type (e.g., N-type) first transistor N1 connected between the inner node M and the negative power voltage VSSD, and with a gate connected to receive the bandgap voltage Vbg (of the bandgap voltage reference circuit 200). Specifically, the second-type first transistor N1 has a drain connected to the inner node M, and a source connected to the negative power voltage VSSD.

The start-up circuit 100 of the embodiment may include a second-type (e.g., N-type) second transistor N2 connected between the output node (i.e., bias voltage Vbias) and the negative power voltage VSSD, and with a gate connected to the inner node M. Specifically, the second-type second transistor N2 has a drain connected to the output node M, and a source connected to the negative power voltage VSSD.

In a start-up period, the positive power voltage VDDD and the negative power voltage VSSD provide to the start-up circuit 100 and the bandgap voltage reference circuit 200. As the positive power voltage VDDD increases, a start-up current Is flows through the series-connected first-type first transistors P1-P3 in a direction from the positive power voltage VDDD to the inner node M. At the same time, according to another aspect of the embodiment, a boost current Ib flows through the first-type second transistor P4 in a direction from the positive power voltage VDDD to the inner node M.

Next, the second-type second transistor N2 is turned on to pull the bias voltage Vbias (at the output node) down to an objective potential. Accordingly, the bandgap voltage reference circuit 200 can output the expected bandgap voltage Vbg. Finally, the second-type first transistor N1 is turned on, thereby turning off the second-type second transistor N2 and finishing the start-up period.

The start-up circuit 100 of the embodiment can start the bandgap voltage reference circuit 200 successfully regardless of process, voltage and temperature (PVT) variations. In a low-temperature (e.g., −40° C.) low-voltage (e.g., 1.55V) condition, for example, as a threshold voltage increases, the bias voltage Vbias should be pulled down near the negative power voltage VSSD, thereby decreasing the start-up current Is. Without the boost current Ib flowing through the first-type second transistor P4, the second-type second transistor N2 cannot fully turn on due to the slightly turned-on second-type first transistor N1. Therefore, the bias voltage Vbias cannot be pulled down to the objective potential, and the bandgap voltage Vbg may be kept in an erroneous state.

In the embodiment, the boost current Ib flowing through the first-type second transistor P4 makes up for insufficient start-up current Is in the start-up period, thereby starting the bandgap voltage reference circuit 200 successfully to generate a correct bandgap voltage Vbg.

The start-up circuit 100 of the embodiment may be adapted to a high-voltage (e.g., 2.8V) scenario. As shown in FIG. 3, the first-type second transistor P4 is controlled by the bias voltage Vbias, which is further controlled by an output of an amplifier 21 in the bandgap voltage reference circuit 200. Accordingly, an excess of the boost current Ib in a high-voltage condition can be prevented, otherwise the second-type second transistor N2 (of the start-up circuit 100) cannot fully turn off after the start-up period and affects the output of the bandgap voltage Vbg (of the bandgap voltage reference circuit 200).

Although specific embodiments have been illustrated and described, it will be appreciated by those skilled in the art that various modifications may be made without departing from the scope of the present invention, which is intended to be limited solely by the appended claims.

What is claimed is:

1. A reference voltage generating system, comprising:
- a bandgap voltage reference circuit that generates a bandgap voltage;
- a start-up circuit that starts the bandgap voltage reference circuit, the start-up circuit providing a bias voltage at an output node to the bandgap voltage reference circuit, and the bandgap voltage being fed to an input node of the start-up circuit, the start-up circuit including:
  - series-connected first-type first transistors through which a start-up current flows in a start-up period, being connected between a positive power voltage and an inner node;
  - a first-type second transistor through which a boost current flows in the start-up period, being connected between the positive power voltage and the inner node, and with a gate that provides the bias voltage at the output node to the bandgap voltage reference circuit; and
  - a second-type second transistor connected between the output node and the negative power voltage, and with a gate connected to the inner node.

2. The system of claim 1, wherein the series-connected first-type first transistors are P-type transistors with gates connected to a negative power voltage.

3. The system of claim 2, wherein the series-connected first-type first transistors comprise:
- a first transistor with a source connected to the positive power voltage;
- a second transistor with a source connected to a drain of the first transistor; and
- a third transistor with a source connected to a drain of the second transistor, and a drain connected to the inner node.

4. The system of claim 1, wherein the first-type second transistor is a P-type transistor with a source connected to the positive power voltage and a drain connected to the inner node.

5. The system of claim 1, wherein the start-up circuit further comprises a second-type first transistor connected between the inner node and a negative power voltage, and with a gate connected to receive the bandgap voltage.

6. The system of claim 5, wherein the second-type first transistor is an N-type transistor with a drain connected to the inner node, and a source connected to the negative power voltage.

7. The system of claim 5, wherein the second-type second transistor is an N-type transistor with a drain connected to the output node, and a source connected to the negative power voltage.

8. The system of claim 1, wherein the bandgap voltage reference circuit comprises:
- an amplifier with an output connected to the output node of the start-up circuit.

9. A start-up circuit, comprising:
- series-connected first-type first transistors through which a start-up current flows in a start-up period, being connected between a positive power voltage and an inner node;
- a first-type second transistor through which a boost current flows in the start-up period, being connected between the positive power voltage and the inner node, and with a gate that provides a bias voltage at an output node to a bandgap voltage reference circuit; and
- a second-type second transistor connected between the output node and the negative power voltage, and with a gate connected to the inner node.

10. The circuit of claim 9, wherein the series-connected first-type first transistors are P-type transistors with gates connected to a negative power voltage.

11. The circuit of claim 10, wherein the series-connected first-type first transistors comprise:

a first transistor with a source connected to the positive power voltage;

a second transistor with a source connected to a drain of the first transistor; and a third transistor with a source connected to a drain of the second transistor, and a drain connected to the inner node.

12. The circuit of claim 9, wherein the first-type second transistor is a P-type transistor with a source connected to the positive power voltage and a drain connected to the inner node.

13. The circuit of claim 9, further comprising a second-type first transistor connected between the inner node and a negative power voltage, and with a gate connected to receive a reference voltage.

14. The circuit of claim 13, wherein the second-type first transistor is an N-type transistor with a drain connected to the inner node, and a source connected to the negative power voltage.

15. The circuit of claim 13, wherein the second-type second transistor is an N-type transistor with a drain connected to the output node, and a source connected to the negative power voltage.

* * * * *